(12) United States Patent
Krishnamoorthy et al.

(10) Patent No.: US 12,546,772 B2
(45) Date of Patent: Feb. 10, 2026

(54) QUARTZ CRYSTAL MICROBALANCE WITH PLASMONIC SENSING CAPACITY

(71) Applicant: LUXEMBOURG INSTITUTE OF SCIENCE AND TECHNOLOGY (LIST), Esch-sur-Alzette (LU)

(72) Inventors: Sivashankar Krishnamoorthy, Esch-sur-Alzette (LU); Rishabh Rastogi, Esch-sur-Alzette (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 1003 days.

(21) Appl. No.: 17/635,419

(22) PCT Filed: Aug. 18, 2020

(86) PCT No.: PCT/EP2020/073105
§ 371 (c)(1),
(2) Date: Feb. 15, 2022

(87) PCT Pub. No.: WO2021/032744
PCT Pub. Date: Feb. 25, 2021

(65) Prior Publication Data
US 2022/0268769 A1    Aug. 25, 2022

(30) Foreign Application Priority Data
Aug. 19, 2019 (LU) ........................ 101354

(51) Int. Cl.
*G01N 33/543*    (2006.01)
*B82Y 15/00*    (2011.01)
(Continued)

(52) U.S. Cl.
CPC ......... *G01N 33/54373* (2013.01); *G01N 5/02* (2013.01); *G01N 21/554* (2013.01);
(Continued)

(58) Field of Classification Search
CPC .. G01N 33/54373; G01N 5/02; G01N 21/554; G01N 21/648; G01N 21/658; G01N 29/022; G01N 2291/0256; B82Y 15/00
See application file for complete search history.

(56) References Cited

U.S. PATENT DOCUMENTS

2012/0105853 A1* 5/2012 Pang .................. G03H 1/02
356/445
2012/0262718 A1  10/2012 Yamada
(Continued)

FOREIGN PATENT DOCUMENTS

JP    2013231686 A * 11/2013 ........... G01N 21/658
JP    2014119263 A *  6/2014 ............. G01N 21/65
(Continued)

OTHER PUBLICATIONS

JP-2014119263-A, English Translation (Year: 2014).*
(Continued)

*Primary Examiner* — Ryan D Walsh
(74) *Attorney, Agent, or Firm* — CANTOR COLBURN LLP (57) ABSTRACT

A quartz crystal microbalance (QCM) sensor is proposed. The QCM sensor comprises a piezoelectric substrate and at least two electrodes in contact with the substrate to induce shear deformations therein through the inverse piezoelectric effect. The substrate has a sensing surface, and, on that surface, a pattern of plasmonic nanoparticle accumulations protruding from the surface. Each accumulation of nanoparticles comprises a plurality of plasmonic nanoparticles arranged about a hump. Plasmonic hot spots are present between neighbouring accumulations of the pattern that are separated a distance that amounts to or to less than the average diameter of the accumulations of the pattern.

18 Claims, 8 Drawing Sheets

(51) Int. Cl.
  *G01N 5/02*      (2006.01)
  *G01N 21/552*    (2014.01)
  *G01N 21/64*     (2006.01)
  *G01N 21/65*     (2006.01)
  *G01N 29/02*     (2006.01)

(52) U.S. Cl.
  CPC ......... *G01N 21/648* (2013.01); *G01N 21/658* (2013.01); *G01N 29/022* (2013.01); *B82Y 15/00* (2013.01); *G01N 2291/0256* (2013.01)

(56) References Cited

U.S. PATENT DOCUMENTS

| | | |
|---|---|---|
| 2013/0045877 A1 | 2/2013 | Yap |
| 2015/0049332 A1 | 2/2015 | Sun |
| 2018/0128947 A1 | 5/2018 | Reinhard |
| 2022/0291172 A1* | 9/2022 | Krishnamoorthy .. G01N 29/022 |

FOREIGN PATENT DOCUMENTS

| | | | |
|---|---|---|---|
| WO | 2006031198 A1 | 3/2006 | |
| WO | 2010130775 A1 | 11/2010 | |
| WO | WO-2019148759 A1 * | 8/2019 | ........... G01N 21/658 |

OTHER PUBLICATIONS

JP-2013231686-A, English Translation (Year: 2013).*
WO-2019148759-A1, English Translation (Year: 2019).*
International Search Report for corresponding application PCT/EP2020/073105 filed Aug. 18, 2020; Mail date Oct. 29, 2020.
Written Opinion of the International Searching Authority for corresponding application PCT/EP2020/073105 filed Aug. 18, 2020; Mail date Oct. 29, 2020.
Danni Hao, "Hybrid Localized Surface Plasmin Resonance and Quartz Crystal Microbalance Sensor for Label Free Boisensing", Biosensors and Bioelectronics 100 (2018) 23-27.
Elin Larsson, "A combined nanoplasmonic and electrodeless quartz crystal microbalance setup", Review of Scientific Instruments 80, 125105 (2009).
Hossam Haick, "Chemical sensors based on molecularly modified metallic nanoparticles", Journal of Physics D: Applied Physics, 40 (2007) 7173-7186.
Sabghamitra Dinda, "Gold nanoparticles adsorption study onto periodic block copolymer using quartz crystal microbalance", Materials Letters 148 (2015) 118-121.
Yuan Deng, "A new analytical experimental setup combining quartz crystal microbalance with surface enhancement Raman spectroscopy and its application in determination of thrombin", Microchemical Journal 132, (2017) 385-390.

* cited by examiner

On Glass

FIG. 8

QUARTZ CRYSTAL MICROBALANCE WITH PLASMONIC SENSING CAPACITY

FIELD OF THE INVENTION

The present invention generally relates to a dual-principle sensor for sensing biological, biochemical and/or chemical substances. More specifically, the present invention relates to a quartz crystal microbalance (QCM) sensor that is capable of plasmonic sensing, such as, e.g., localised surface plasmon resonance (LSPR), surface enhanced Raman spectroscopy (SERS) and metal-enhanced fluorescence (MEF).

BACKGROUND OF THE INVENTION

QCM sensors comprise a wafer made of a quartz crystal or another piezoelectric material. The wafer has electrodes disposed on its two surfaces. When the substance to be analysed is adsorbed on the sensing surface, this produces a slight change in the resonance frequencies of the quartz crystal oscillator. By exciting the quartz crystal into mechanical resonance via the inverse piezoelectric effect, the resonance frequency shifts can be measured and the adsorbed (or removed) mass be deduced. A QCM sensor is a very sensitive scale, capable of weighting to the order of nanograms/cm$^2$. The shift in frequency can be related to the adsorbed mass using analytical equations.

QCM is label-free and may be made analyte-specific with receptors introduced on the surface. It has no way to tell if all the analyte interaction with the surface happens due to the receptors (a common issue with any label-free detection). This can be circumvented in part by other types of information, e.g. vibrational signals, or fluorescence signals from the molecule. Accordingly, an additional technique that provides independent feedback on another parameter of the bioassay, e.g. vibrational spectra of the molecules, or their fluorescence, can help to enhance both analytical and calibration sensitivities, and can help to validate the outcome of the QCM measurement. Combining such orthogonal sensing modalities together with QCM is however challenging, especially, since the additional sensing technique needs be adapted to the QCM chip, preferably without significantly increasing the cost per QCM chip (thus cost per experiment).

SPR is a method for detecting chemical changes occurring at the interface of a plasmonic material and another medium, such as, e.g., air, water, or another fluid. SPR measures changes in the optical thickness (i.e. refractive index) arising from molecular adsorption on the metal surface.

SPR and QCM have been previously combined, as reported, e.g., in WO 2006/031198 and WO 2010/130775.

WO 2006/031198 discloses a sensor chip assembly for use in a sensor capable of Surface Plasmon Resonance (SPR) and gravimetric sensing. The assembly comprising a transparent piezoelectric substrate having a first surface and a second surface opposite to the first surface. The assembly also comprising first and second thin film metal electrodes respectively provided on the first and second surfaces of the substrate. The second thin film metal electrode is positioned on the second surface of the substrate such that a light beam is capable of being transmitted through the second surface of the substrate and reflected from the first thin film metal electrode. The assembly also comprising an attenuated total reflection (ATR) coupler disposed adjacent to the second thin film metal electrode.

WO 2010/130775 relates to an arrangement that combines a quartz crystal microbalance with dissipation monitoring (QCM-D) with a localized surface plasmon resonance sensor (LSPR sensor).

The QCM and SPR sensing techniques have their own specific strengths and weaknesses, Although the combination of QCM and SPR improves the analytical capabilities with respect to both techniques taken individually, there is still room for improvement of such combined sensors.

SUMMARY OF THE INVENTION

According to a first aspect of the invention, a quartz crystal microbalance (QCM) sensor is proposed. The QCM sensor comprises a piezoelectric substrate and at least two electrodes in contact with the substrate to induce shear deformations therein through the inverse piezoelectric effect. The substrate has a sensing surface, and, on that surface, a pattern of plasmonic nanoparticle accumulations protruding from the surface. Each accumulation of nanoparticles comprises a plurality of plasmonic nanoparticles arranged about a hump. Plasmonic hot spots are present between neighbouring accumulations of the pattern that are separated by a distance (inter-accumulation distance) that amounts to or to less than the average diameter of the accumulations of the pattern (these plasmonic hot spots will be called "inter-accumulation plasmonic hot spots"). In this context, it is worthwhile noting that the inter-accumulation distance between a first accumulation and a second accumulation is considered to be the smallest distance that can be found between a nanoparticle of the first accumulation and a nanoparticle of the second accumulation. Preferably, the said inter-accumulation distance amounts to 20 nm or less, more preferably to 15 nm or less and, most preferably, to 10 nm or less. Preferably, the humps are essentially ellipsoidal-cap-shaped (e.g. spheroid-cap-shaped). The ratio h/D of the height (h) to the base diameter (D) of the humps is preferably not higher than 1; more preferably, 0.1≤h/D≤0.8; still more preferably, 0.2≤h/D≤0.7. Thanks to the ellipsoidal-cap-shape of the humps, the interstices between the humps taper towards the substrate and analyte moieties can more easily reach the "bottom" of the interstices and thus the inter-accumulation plasmonic hot spots. Preferably also, the proportion of inter-accumulation distances that are less than 10 nm is at least 10%, more preferably at least 20%, yet more preferably at least 30%, still more preferably at least 40% and most preferably at least 50% of the total number of inter-accumulation distances.

Plasmonic sensing based on surface-enhanced Raman spectroscopy (SERS) and metal-enhanced fluorescence (MEF) relies on the presence of enhanced electromagnetic (EM) fields at specific sites known as (plasmonic) hot spots between plasmonic nanostructures. When these nanostructures are excited at a specific wavelength, electromagnetic fields are generated, giving rise to localized surface plasmon resonance (LSPR). The proximity of the nanoparticle accumulations ascertains that such hot spots occur with a relatively high density over the sensing surface.

It may be worthwhile noting that, within the individual accumulations, the nanoparticles may be closer together. Preferably, the intra-accumulation inter-particle separation between nearest-neighbour nanoparticles amounts to or to less than the average nanoparticle diameter. More preferably the intra-accumulation inter-particle separation between nearest-neighbour nanoparticles amounts to or to less than 100% (or to less than 90%, 80%, 70%, 60%, 50%, 40% or 30%) of the average nanoparticle diameter. The fact that the nanoparticles form nanogaps within the accumulations gives rise to a second type of plasmonic hot spots ("intra-accumulation plasmonic hot spots"). Accordingly, the pattern on the QCM sensing surface has dual-length-scale plasmonic hot spots.

With an accurate measure of the surface concentration of nanoparticles, and the analyte on the plasmonic surface using QCM, higher sensitivity in bioassays was found. This may be attributed to the co-localization of analyte at intra-accumulation or inter-accumulation hot spots depending on the size of the analyte.

In addition to optimizing the geometry of the humps and the accumulations of nanoparticles, (locally) enhanced electromagnetic fields can obtained by a careful choice of the sensing surface. For instance, a reflective gold surface could contribute to EM field enhancements through the so-called mirror effect.

The plasmonic nanoparticles could be of any shape (e.g., triangular, rod-shaped, cubic, octahedral, etc.) Preferably, however, the plasmonic nanoparticles are spherical.

Preferably, the plasmonic nanoparticles have an average diameter in the range from 7 to 50 nm, more preferably in the range from 8 to 40 nm and even more preferably in the range from 8 to 30 nm. In the context of the present document, the term "diameter" means the smallest distance that can be formed between two opposite parallel planes tangent to the convex hull of the object under consideration (which can be a nanoparticle accumulation). The measurement of diameters may be made by SEM and/or AFM, using direct and/or indirect measurements. If direct diameter measurements with SEM turn out to be difficult because the boundaries of the objects under consideration are not neat (in case of a highly charging surface), the measurements can be made using AFM or indirect measurement by SEM. It is known that AFM suffers from tip convolution effects, which affect the lateral resolution. Nevertheless, these effects can be corrected to some extent by taking the tip specifications into account. Feature diameters can also be measured indirectly by SEM. According to this technique, conducting (e.g. metal) nanoparticles of known diameter are adsorbed on the object under consideration in order to improve conductivity and resolution. The diameter of the object under consideration can then be determined using the double nanoparticle diameter as the maximum possible deviation.

The plasmonic nanoparticles preferably comprise plasmonic metal nanoparticles. Plasmonic metals include, for instance, gold, silver or aluminium. Among these gold nanoparticles may be specifically preferred in typical applications.

The plasmonic nanoparticles could be stabilized with a capping agent, e.g. citrate, CTAB (Cetyl Trimethyl Ammonium Bromide), PEI (polyethyleneimine), PVP (polyvinyl pyrrolidone), chitosan, or other organic molecules.

The sensing surface could comprise a plasmonic metal surface, e.g. a gold surface. Advantageously, the sensing surface belongs to one of the electrodes of the QCM sensor.

The plasmonic nanoparticles are preferably electrically insulated from the electrode by a coating on the plasmonic nanoparticles and/or a coating on the electrode. The coating could be a coating of capping agent or a functionalisation layer on the plasmonic nanoparticles and/or on the electrode surface.

The nanoparticle accumulations may comprise a functionalisation for binding to an analyte. Preferably, the plasmonic nanoparticles are functionalized with receptor moieties specifically binding to an analyte.

The sensing surface may comprise, between the nanoparticle accumulations, a functionalisation for binding to an analyte. The functionalisation between the nanoparticle accumulations and the functionalisation of the nanoparticle accumulations could be specific for the same analyte. Alternatively, the functionalisation between the nanoparticle accumulations and the functionalisation of the nanoparticle accumulations could be specific for different analytes.

A further aspect of the invention relates to a method for detecting an analyte. The method comprises providing a QCM sensor as described herein, contacting the sensing surface with a fluid to be analysed for the presence and/or the concentration of the analyte, thereby allowing adsorption of the analyte on the sensing surface, detecting adsorption of the analyte on the sensing surface by at least one of localised surface plasmon resonance (LSPR), surface enhanced Raman spectroscopy (SERS) and metal enhanced fluorescence (MEF) measurement(s), and determining an amount of adsorbate by QCM measurement(s).

Plasmonic assays typically relate the plasmonic signal (e.g. Raman intensities or fluorescence intensities), as a function of concentration of analyte applied to the sensor, to obtain a calibration curve. However, the assays do not provide any information on the actual molecules that are present on the sensing surface because the electromagnetic field enhancements are strongly non-linear in hot spots. The information on biomolecular attachment is necessary to optimize the sensor interface, via independent feedback to the surface concentration changes in relation to the assay conditions. It will thus be appreciated that the electromagnetic field enhancements, and the biomolecular attachment on to the chip can be measured independently from each other. This opens new possibilities rational interface designs and for troubleshooting.

To summarize, the invention combines QCM with plasmonic sensing using patterns designed to have inter-accumulation hot spots. The complementary measurements made by plasmonic sensing can effectively be correlated with the mass changes measured by QCM. For the plasmonic sensors, they provide unique possibility to provide also the surface concentration of the molecules that actually contribute to the final signal. The QCM measurements indicate concentration on the surface of the molecules that actually contribute to the plasmonic signals, and the combination of both techniques thus opens the possibility to optimize the structure of the sensing surface on nanoscale level for specific analytes, if necessary on a case-by-case basis.

BRIEF DESCRIPTION OF THE DRAWINGS

By way of example, preferred, non-limiting embodiments of the invention will now be described in detail with reference to the accompanying drawings, in which.

DETAILED DESCRIPTION OF PREFERRED EMBODIMENTS AND EXAMPLES

Figure 1:
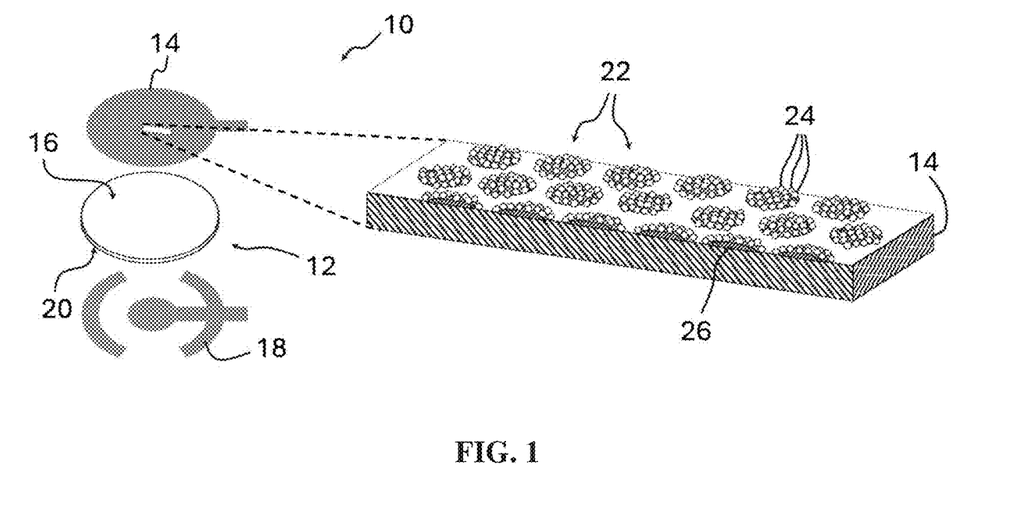
FIG. 1: is a schematic illustration of a QCM sensor (shown in exploded perspective view on the left-hand side) having its sensing surface modified with plasmonic nanostructures (enhanced detail on the right-hand side) for plasmonic sensing.
Figure 2:
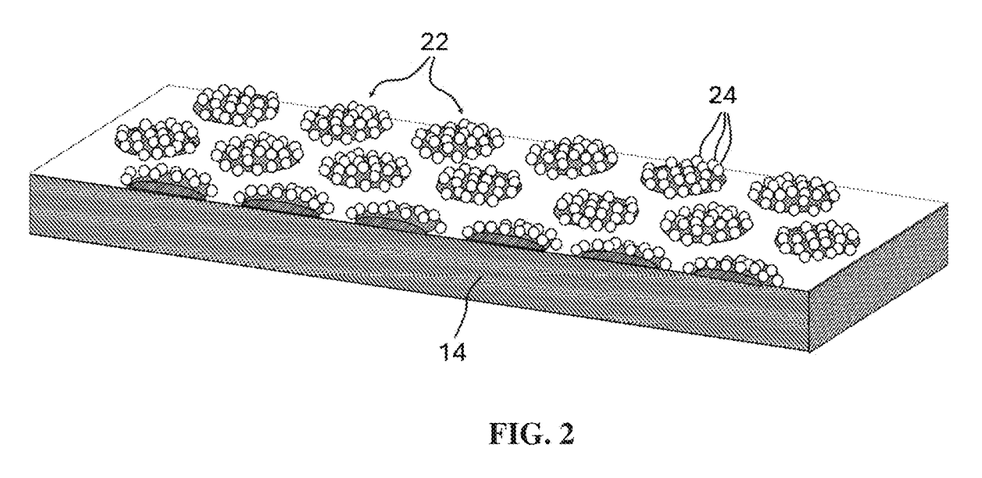
FIG. 2: is a perspective schematic view of a pattern of plasmonic nanostructures on the sensing surface of a QCM sensor in accordance with the invention.

An example of a QCM sensor with plasmonic sensing capability according to an embodiment of the invention is illustrated in FIG. 1. The QCM sensor 10 comprises a hair-thin wafer 12 made of piezoelectric crystal, such as, e.g. a quartz crystal (typically AT- or SC-cut). The wafer 12 has a first, planar, electrode 14 arranged on its front face 16 as well as a second electrode 18 on its rear face 20. A voltage that is applied between the first and second electrodes induces a shear deformation in piezoelectric crystal. An alternating voltage causes the crystal to oscillate back and forth. When matter is adsorbed on or released from the sensing surface, this produces a slight change in the resonance frequencies of the oscillator. By exciting the crystal into mechanical resonance via the inverse piezoelectric effect, the resonance frequency shifts can be measured and the adsorbed (or removed) mass be deduced. A QCM sensor is a very sensitive scale, capable of weighting to the order of $ng/cm^2$. The shift in frequency can be related to the adsorbed mass using analytical equations, taking into account dissipation (quartz crystal microbalance with dissipation monitoring, QCM-D).

The surface of the first electrode 14 represents the sensing surface of the QCM sensor 10. A pattern of plasmonic nanoparticle accumulations 22 is arranged on the sensing surface. Each individual accumulation of nanoparticles 22 comprises a plurality of plasmonic nanoparticles 24 arranged about a hump 26. The nanoparticles are assembled relatively densely about the humps 26, such that the interparticle separation between nearest-neighbour nanoparticles of the same accumulation amounts to or to less than 100% of the average nanoparticle diameter. Plasmonic coupling can occur when the particles are separated by distances below the diameter of the particles, although the effect is stronger as they get closer—accordingly, smaller interparticle separation, e.g. less than 80% or less than 60% may be preferred. Furthermore, the humps 26 and thus the accumulations are also arranged so as to form a dense pattern. The lattice pitch of this pattern is chosen such that neighbouring accumulations of the pattern are separated by 10 nm or less. Thanks to the small (inter-accumulation and intra-accumulation) distances between the nanoparticles, plasmonic hot spots are present on the sensing surface. These hot spots may include intra-accumulation hot spots and inter-accumulation hot spots, which may, typically, have different characteristic dimensions.

Plasmonic bioassays based on surface-enhanced Raman spectroscopy (SERS) to detect biomolecular analytes rely both on the control over metal nanostructure geometries at a spatial resolution of only a few nanometres, while at the same time, impacted by bioassay parameters that determine biomolecular interactions on the surface. SERS has relied on a non-linear enhancement to the electromagnetic field in close proximity to metal nanostructures. The electromagnetic (EM) field enhancement has been shown on random as well as ordered surfaces, while the latter contributing to a rational understanding of the impact of geometric variables towards resulting plasmonic enhancements. Regions of high EM enhancements, otherwise called electromagnetic (or plasmonic) hot spots result due to lightning-rod effect at sharp metal edges, and plasmonic coupling occurs between closely separated metal structures. Having nanogaps out of periodic nanoarrays yields advantage of lower distribution in gap characteristics, and makes it easier to model, and also to maximize enhancements when optimal gap dimensions are identified. Highly enhanced EM field is the basis for plasmon-enhanced spectroscopy, including metal-enhanced fluorescence, and surface-enhanced Raman spectroscopy. While increased proximity has known to result in best enhancements for SERS, the application of these structures directly for sensing poses fundamental limitations for the spatial requirements of molecules that are larger than the gap itself. Given the distance-dependent decay of EM field away from the gap, the enhancement would best be felt only by the species that are of the order of the hot spots themselves and are also strategically positioned at those regions. During sensing experiments, if there was no attempt to selectively guide analytes to bind to the hot spots, the analytes would be distributed statistically throughout the array, while the vibrational Raman signals from the molecules present in the hot-spot regions would disproportionately dominate the signal contributions. This makes quantitative sensing particularly challenging, considering that the analyte concentrations may not necessarily determine the signal intensities, but their distribution in relation to the hot spots would eventually determine overall sensitivity. Thus, for rational optimization of plasmonic bioassays, it would thus be necessary to decorrelate the contributions towards the final signal of EM enhancements and analyte surface concentrations, by performing independent optical and bio-interaction analysis.

The nanoparticle accumulation pattern can be fabricated by self-assembly of gold nanoparticles guided by nanopatterns of PS-b-P2VP (poly(styrene-block-2-vinylpyridine)) reverse micelles on the planar gold front electrode of a conventional QCM sensor.

PS-b-P2VP reverse micelle arrays could be deposited from solutions of m-xylene. A thin film can be obtained by spin-coating on the front electrode of a QCM sensor. The thin film presents itself as a hexagonal lattice of P2VP domains covered with a thin PS film. The centre-to-centre spacing of the PS-b-P2VP templates or humps can be adjusted via the copolymer characteristics. Thanks to the basicity the pyridyl moieties, the central P2VP block of each template exhibits a net positive charge in aqueous medium at mildly basic to acidic pH values. The thickness of the PS coating of each template can be reduced by controlled oxygen plasma reactive ion etching and thereby the distances between the humps can be increased (without changing the centre-to-centre distances). The QCM sensor surface with the templates can subsequently be incubated in an aqueous dispersion of citrate-stabilized gold nanoparticles.

The ζ (zeta) potential of the gold nanoparticles being negative, while the reverse micelle templates exhibiting a positive ζ potential at the pH of the nanoparticle suspension (pH<pI, with "pI" designating the isoelectric point of the reverse micelle film), the gold nanoparticles are electrostatically attracted onto the reverse micelle templates. This results in accumulations (clusters) of gold nanoparticles about the reverse micelle humps. Since the P2VP domains are spatially isolated from each other, the obtained nanoparticle accumulations are also spatially well resolved.

Let N denote the (average) number of gold nanoparticles per reverse micelle hump. N can be adjusted by tuning the hump dimensions. This can be done by selecting specific copolymer characteristics, e.g., molecular weight, block composition, or micelle-forming conditions that result in reverse micelles with different aggregation numbers. Additionally or alternatively, the hump dimensions (height, diameter, shape) can also be adjusted by controlled oxygen plasma reactive ion etching.

Figure 3:
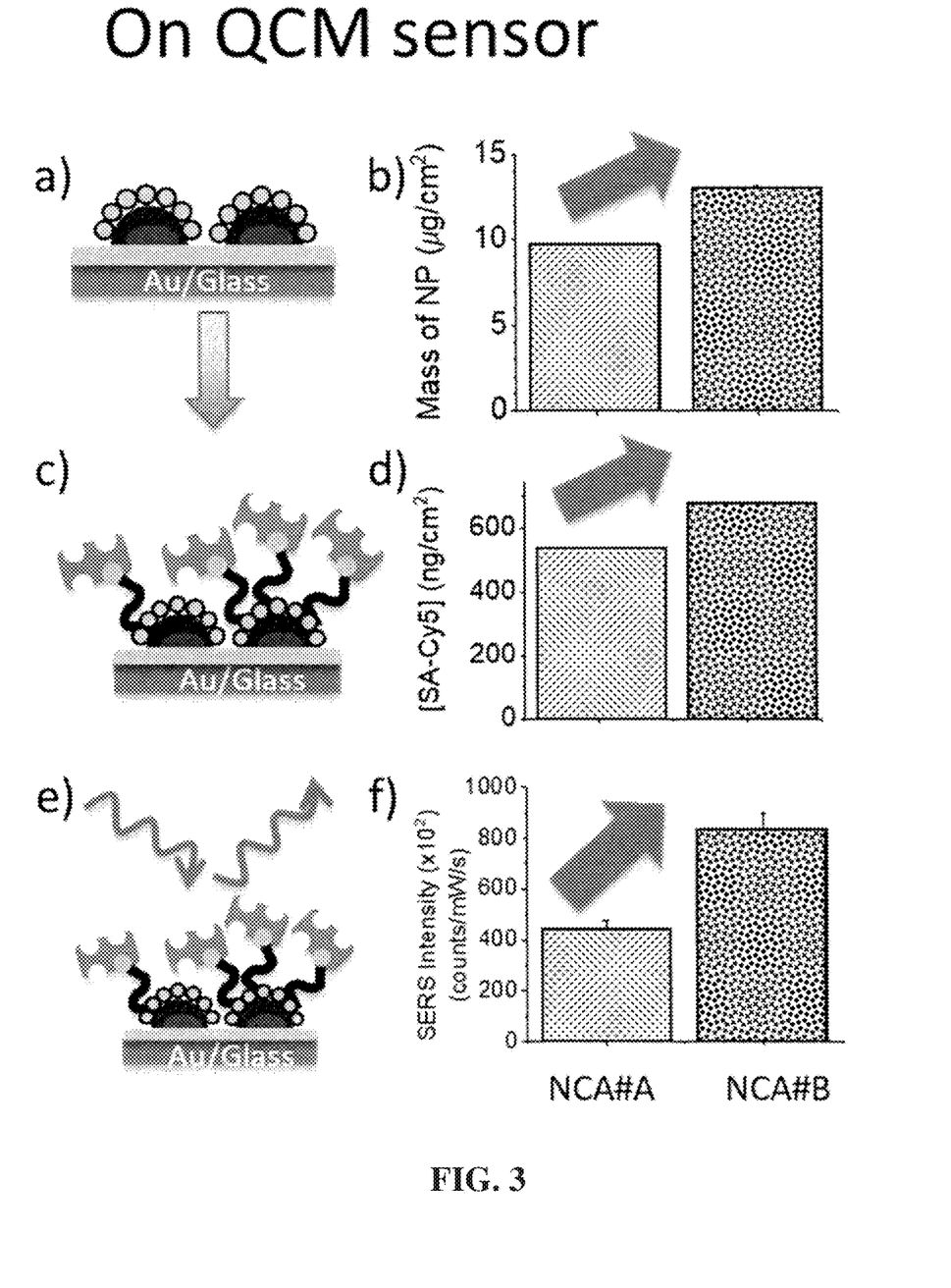
FIG. 3: is an illustration of an experiment carried out with a QCM sensor according to the invention.

FIG. 3 relates to a study made with QCM sensors comprising patterns of plasmonic nanoparticle accumulations on the surface of their front gold electrode. The QCM sensor was produced in a first (NCA #A) and a second (NCA #B) version differing by the mass of gold nanoparticles on the sensing surface and thus by N (FIG. 3$b$)). The mass of nanoparticles for NCA #A and NCA #B was approx. 10 µg/cm$^2$ and 15 µg/cm$^2$ respectively, whereas the density of the humps for NCA #A and NCA #B was 100±10/µm$^2$ and 300±30/µm$^2$, respectively. The inter-accumulation distances in NCA #A and NCA #B were the same (~10 nm) and the same was true for the intra-accumulation distances (~5 nm).

The nanoparticles on the first and second QCM sensors were biotinylated in order to obtain ligand-modified nanoparticles. The NCA #A and NCA #B were first functionalized using PEG biotin thiol (0.4 kDa) (BPT), by immersion for 2 hours in the freshly prepared solution of 2 mM PEG biotin thiol in deionized water. The substrates were rinsed afterwards with PBS and DI water to remove BPT loosely bound to the surface. Subsequently, the substrates were immersed in 1% freshly prepared solution of Bovine serum albumin (BSA) in PBS in order to block any exposed gold or polymer surfaces to prevent non-specific binding of Streptavidin. In the third step, diced and pierced PDMS blocks were then placed/aligned above the substrates with functionalized patterns and the streptavidin solutions of varying concentrations were poured into the well exposing the surface-bound biotin head groups to the Streptavidin-conjugated dye molecules (FIG. 3$c$)). Each substrate was exposed to Streptavidin conjugated with Cy5 dye (SA-Cy5) for 2 hours at different concentration in each well, in the concentration range of 1-800 nM. This was followed by several cycles of rinsing with the buffer, followed by removal of the PDMS blocks and subsequent washing and drying with nitrogen. The substrates exposing regions of different surface concentrations of SA-Cy5 was subjected to SERS measurements. The adsorbed mass SA-Cy5 was measured by QCM-D. It was found that the adsorbed mass of SA-Cy5 correlated well with the mass of gold nanoparticles (FIG. 3$d$)). SERS intensity was measured as well (FIG. 3$e$)) and was found to increase by far more than the mass of gold nanoparticles (FIG. 3$f$)).

Figure 4:
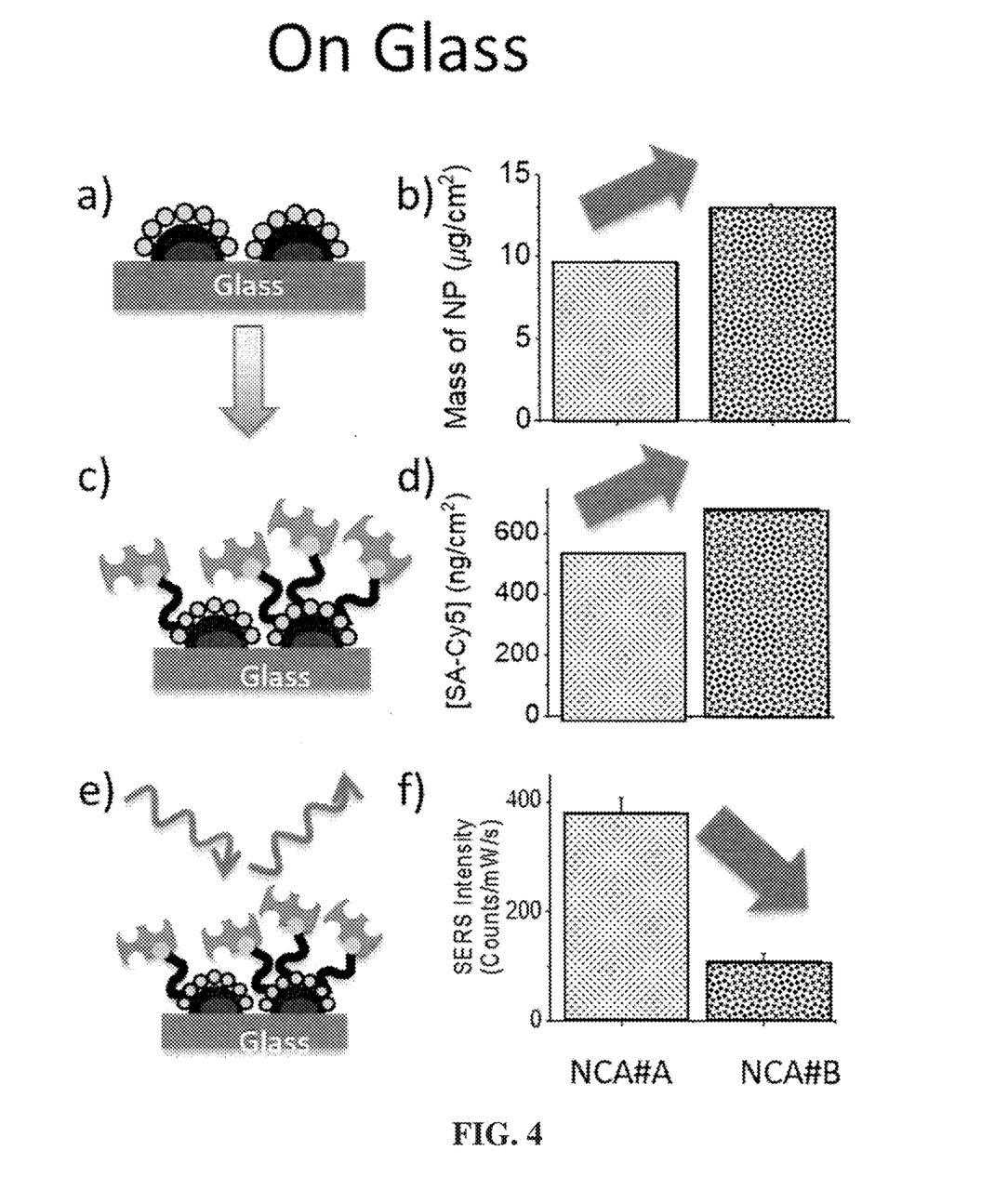
FIG. 4: is an illustration of the same experiment carried out on a glass substrate for comparison with the experiment of FIG. 3.

The same experiment as illustrated in FIG. 3 was also made on a glass substrate. Except for the substrate, all conditions of the experiment were identical. However, it was found that the SERS intensity decreased with an increasing mass of gold nanoparticles.

Figure 5:
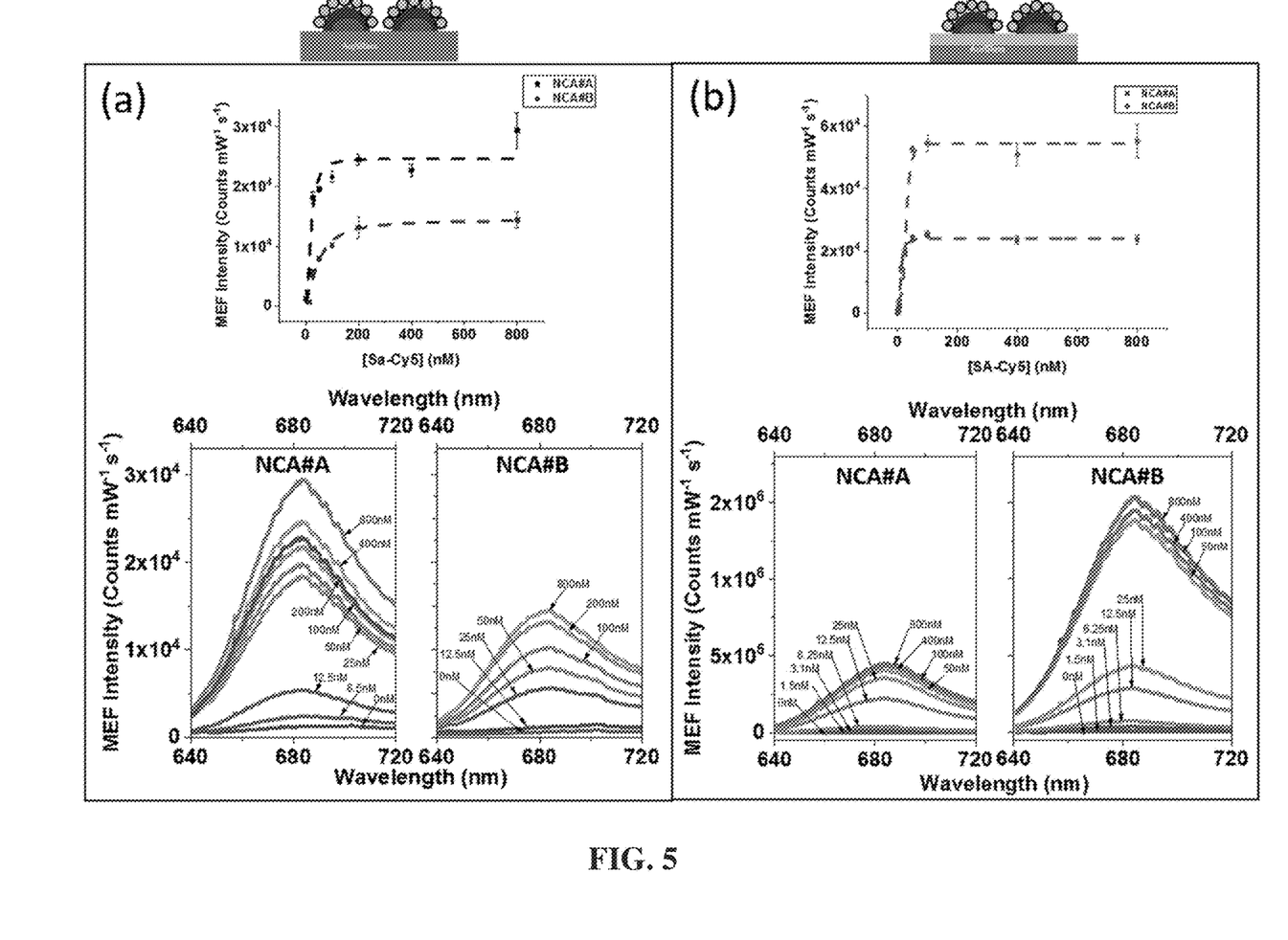
FIG. 5: shows MEF measurements made with two different nanoparticle patterns on (a) a quartz chip and (b) a gold-coated quartz chip.

FIG. 5 shows a comparison of MEF signals obtained by performing biomolecular assays of SA-Cy5 for NCA #A and NCA #B an (a) a quartz chip and (b) a gold-coated quartz chip.

The significant difference between the measured SERS and MEF intensities may be attributed to the so-called mirror effect. Plasmonic hot spots boosted by the mirror effect (due to the gold substrate) could indeed disproportionately contribute to the SERS signal. When plasmonic nanoparticles are assembled over a continuum metallic film, they are allowed to couple with their own mirror image in the metallic film. This causes the EM field to concentrate at the inter-accumulation gaps. When the substrate is glass, the mirror effect is absent and a higher concentration of nanoparticles was even found to be detrimental to the SERS signal. FIGS. 3 and 4 illustrate that plasmonic assays do not provide information on the actual molecules that are present on the sensing surface because the electromagnetic field enhancements are strongly non-linear in hot spots.

When the size of the nanoparticle accumulations was made smaller while the inter-accumulation distances were kept constant, the sensitivity of the QCM sensor towards protein bioassays became higher. This increase in sensitivity does not correlate with the global nanoparticle densities, nor the protein surface concentrations, indicating the determining role of electromagnetic enhancement at the hot spots. Numerical simulations indicate that the electromagnetic enhancements may be higher at intra-accumulation hot-spots for larger accumulations and at inter-accumulation hot-spots for smaller clusters. Given the dimension of biotin-streptavidin pair, spatial co-localization of the binding event with electromagnetic hot-spots can be realized only at inter-accumulation hot spots. When the surfaces were challenged with analyte molecules smaller than intra-accumulation hot spots, the smaller accumulations showed only a marginally higher sensitivity than the larger accumulations. Another factor that favored the higher signal levels for smaller accumulations includes a higher density of hot spots. Reducing the size of the accumulations enabled greater opportunity for the larger analyte such as protein to take advantage of the EM hot-spots at the inter-accumulation spaces, which enabled higher sensitivity in case of protein bio-assays.

In the tests that were carried out, the geometry of periodic gold nanoparticle accumulation arrays could be tailored in relation to the analyte dimensions to enable higher sensitivity towards detection of molecular analytes. Patterns with plasmonic hot spots of two different length scales corresponding to inter-accumulation and intra-accumulation inter-particle distances were investigated. It was found that a the first pattern (NCA #A) with smaller accumulations that had a greater number of inter-accumulation hot spots to accommodate larger protein molecule was found to be more sensitive with the protein assay than the second pattern (NCA #B) with a lesser number of inter-accumulation hot spots. However, both patterns had similar sensitivity towards a small analyte molecule that could be accommodated within both inter-accumulation as well as intra-accumulation hot-spots. The findings support the need to take into account the size of the analyte in relation to the hot spot geometry to rationally design nanoarrays for plasmonic sensing.

A similar experiment as described with reference to FIGS. 3 and 4 (detection of SA-Cy5) was carried out with a significantly smaller target analyte: 1-napththalene thiol (1-NT). While SA-Cy5 is a relatively large molecule and thus is expected to have no or only very limited access to the intra-accumulation hot spots, 1-NT should have much better access to the intra-accumulation hot spots.

NCA #A and NCA #B fabricated on a substrate with low reflectivity, i.e. quartz, and high reflectivity, i.e. gold coated Quartz, were immersed overnight in an ethanolic solution of 1-NT with systematically increasing concentrations. Substrates from each concentration were then immediately scanned under confocal Raman set up (InVia—Renishaw Inc., UK) and most intense peak at 1372 cm$^{-1}$ was followed to understand the impact of monolayers to sub-monolayers on the SERS signal from the surface. As the concentration in the solution decreases the surface concentration is expected to follow the same trend, which can be observed here through SERS signals.

Figure 6:
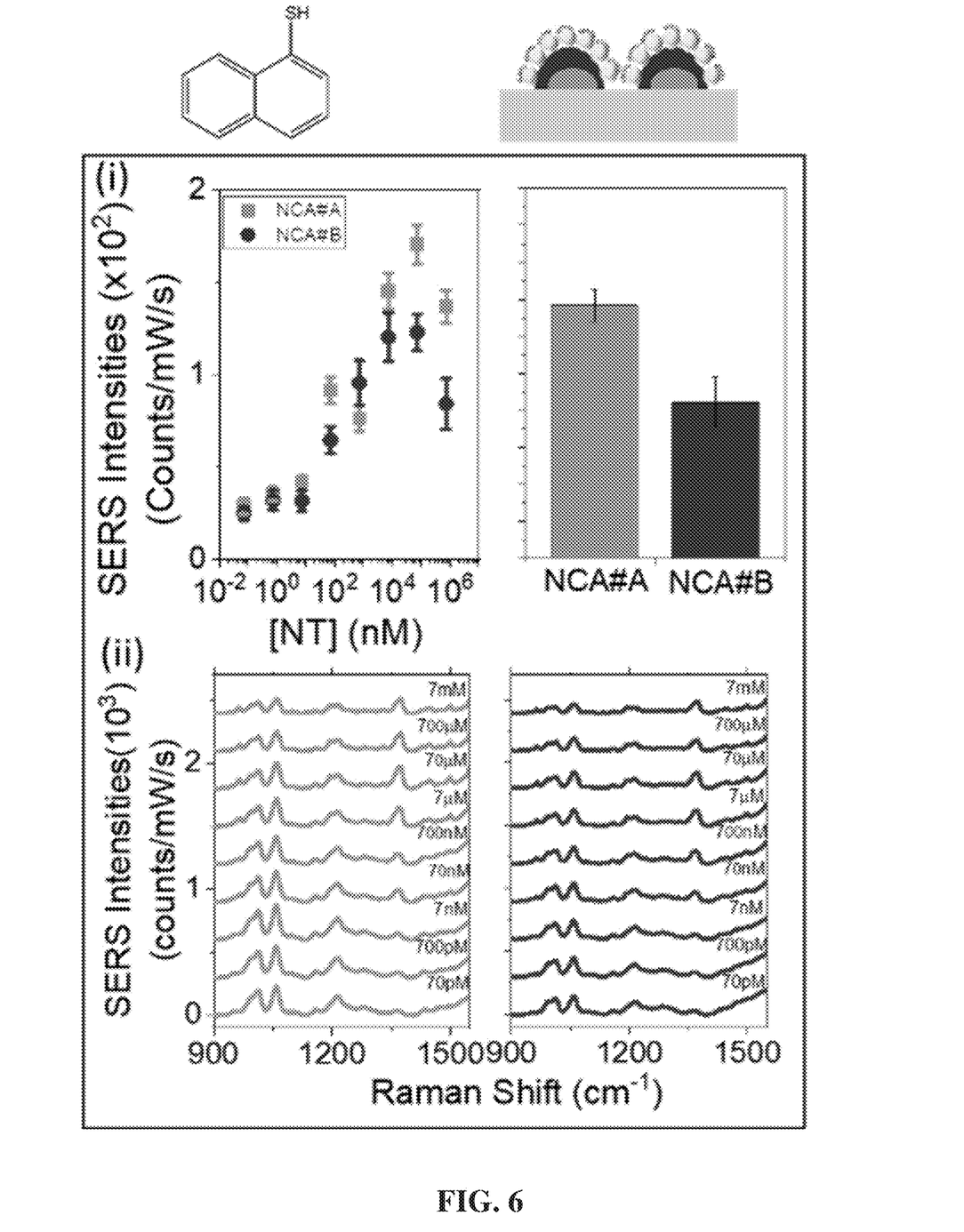
FIG. 6: shows the result of SERS measurements obtained with the same nanoparticle patterns on quartz and the corresponding SERS spectral intensities for these patterns.
Figure 7:
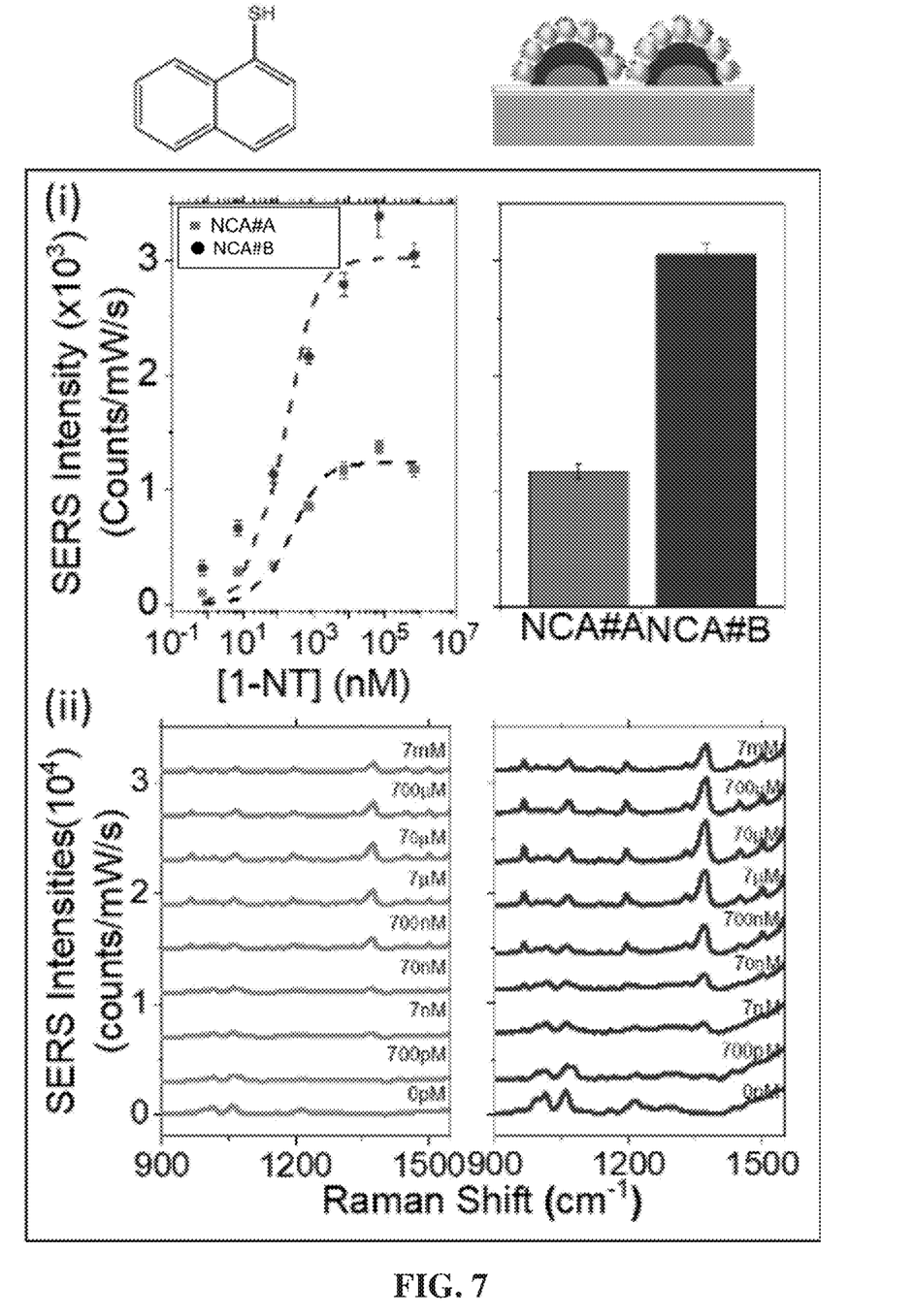
FIG. 7: shows the result of SERS measurements obtained with the same nanoparticle patterns on gold-coated quartz and the corresponding SERS spectral intensities for these patterns.

FIG. 6 shows
- (i) the measured SERS intensities as a function of 1-NT concentration for NCA #A and NCA #B patterns fabricated on quartz and
- (ii) the SERS spectral intensities for these NCA #A (left) and NCA #B (right) patterns. FIG. 7 shows
- (i) the measured SERS intensities as a function of 1-NT concentration for NCA #A and NCA #B patterns fabricated on gold-coated quartz (QCM sensor) and
- (ii) the SERS spectral intensities for these NCA #A (left) and NCA #B (right) patterns.

The NCA #A pattern thus performs better on quartz chips in the absence of gold film underneath, whereas the NCA #B pattern performs better when there is a gold film underneath. This phenomenon can be attributed to the difference in the height of the patterns as well as the critical distance from the surface for the mirror effect due to the presence of the gold film.

Figure 8:
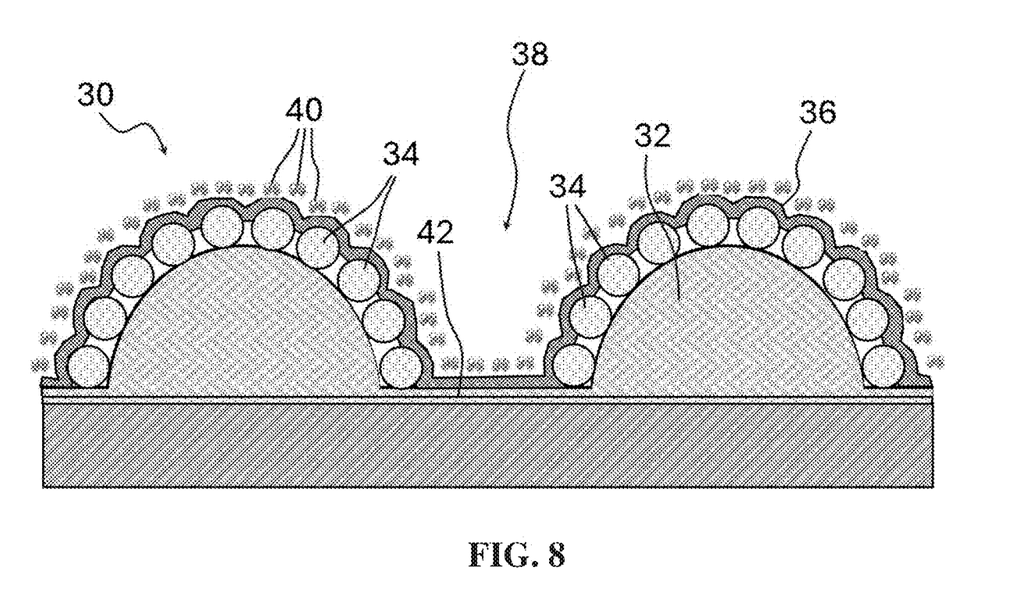
FIG. 8: is a schematic illustration of a QCM sensor comprising plasmonic nanoparticle accumulations on reverse micelle humps including a surface functionalisation on the nanoparticle accumulations and on the sensor surface between the nanoparticle accumulations.

FIG. 8 shows an embodiment of an inventive QCM chip 30 comprising plasmonic nanoparticle accumulations on reverse micelle humps 32 including a surface functionalisation on the nanoparticle accumulations and on the sensor surface between the nanoparticle accumulations. The hump pattern was fabricated by self-assembly of reverse micelles on the planar gold front electrode of a conventional QCM sensor. The nanoparticle accumulations were then formed by self-assembly of gold nanoparticles 34 on the reverse micelle humps 32.

The QCM sensor surface was first functionalized with a functionalization 36 of PEG biotin thiol (0.4 kDa) (BPT), by immersion for 2 hours in the freshly prepared solution of 2 mM PEG biotin thiol in deionized water. The substrates were rinsed afterwards with PBS and DI water to remove BPT loosely bound to the surface. Subsequently, the substrates were immersed in 1% freshly prepared solution of Bovine serum albumin (BSA) in PBS in order to block any exposed gold or polymer surfaces to prevent non-specific binding of Streptavidin. The BPT was expected to form a self-assembled monolayer on the gold surface guided by thiol-gold interactions, subsequently directing the attachment of SA-Cy5 through biospecific interactions. The portion of the nanoparticle surface available for adsorption of SA-Cy5 can be modelled as a spheroidal cap, taking into account the radius of the nanoparticle together with the thickness of the BPT layer and height of the cap.

Adsorption tests with SA-Cy5 40 revealed that adsorption of the SA-Cy5 also occurred in the interstices 38 between the nanoparticle accumulations (FIG. 8). The BPT or SA-Cy5 were not expected to adsorb to the area around (and between) the nanoparticle accumulations under the conditions of the experiment. However, it turned out that the area around (and between) the nanoparticle accumulations had a thin layer of polymer 42 formed by the fusion of the coronal blocks of the reverse micelles when they were deposited on the surface. It was shown in a control experiment (a QCM sensor coated with a thin film of the polymer was exposed to BPT) that BPT adsorbs well onto such a polymer surface, with observed densities of ~400 ng/cm$^2$, followed by a negligible quantity of BSA and 690 ng/cm$^2$ of SA-Cy5. Based on the exposed polymer area, this would correspond to a density of 362 ng/cm$^2$ between the nanoparticle accumulations. The strong affinity of biotin-streptavidin interactions on the polymer layer 42 supports well the contribution from the inter-accumulation surface towards the observed mass densities of SA-Cy5. This brings the theoretical total mass density from the modelized surface into close agreement with the observed value of 414 ng/cm$^2$. The consequence of the availability of the SA-Cy5 between the nanoparticle accumulations allows them to benefit from inter-accumulation electromagnetic hot-spots, enabling high sensitivity in MEF assays.

While specific embodiments and examples have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A quartz crystal microbalance (QCM) sensor comprising a piezoelectric substrate,
    at least two electrodes in contact with the substrate to induce shear deformations therein through inverse piezoelectric effect,
    the substrate having a sensing surface, and on that surface, a pattern of plasmonic nanoparticle accumulations protruding from the surface, wherein each nanoparticle accumulation comprises a plurality of plasmonic nanoparticles arranged about an ellipsoidal-cap-shaped hump, and wherein inter-accumulation plasmonic hot spots are present between neighbouring accumulations of the pattern that are separated a distance that amounts to or to less than the lesser of the average diameter of the accumulations of the pattern and 10 nm, and wherein the sensing surface comprises a plasmonic metal surface.

2. The QCM sensor as claimed in claim 1, wherein the plasmonic nanoparticles are spherical.

3. The QCM sensor as claimed in claim 1, wherein the plasmonic nanoparticles have an average diameter in the range from 7 to 50 nm.

4. The QCM sensor as claimed in claim 1, wherein an intra-accumulation inter-particle separation between nearest-neighbour nanoparticles amounts to or to less than the average nanoparticle diameter.

5. The QCM sensor as claimed in claim 1, wherein the plasmonic nanoparticles comprise plasmonic metal nanoparticles.

6. The QCM sensor as claimed in claim 5, wherein the plasmonic metal nanoparticles comprise gold nanoparticles.

7. The QCM sensor as claimed in claim 1, wherein the plasmonic nanoparticles are stabilized with a capping agent.

8. The QCM sensor as claimed in claim 7, wherein the capping agent comprises at least one of citrate, cetyl trimethyl ammonium bromide, polyethyleneimine, polyvinyl pyrrolidone, and chitosan.

9. The QCM sensor as claimed in claim 1, wherein the sensing surface belongs to one of the electrodes.

10. The QCM sensor as claimed in claim 9, wherein the plasmonic nanoparticles are electrically insulated from said electrode by at least one of a coating of the plasmonic nanoparticles and a coating of the electrode.

11. The QCM sensor as claimed in claim 1, wherein the plasmonic nanoparticles are functionalized with receptor moieties specifically binding to an analyte.

12. The QCM sensor as claimed in claim 1, wherein the humps have a height and a base diameter, the ratio of the height to the base diameter of the humps being situated in the range from 0.1 to 0.9.

13. The QCM sensor as claimed in claim 1, wherein the sensing surface comprises, between the nanoparticle accumulations, a functionalisation for binding to an analyte.

14. The QCM sensor as claimed in claim 13, wherein the nanoparticle accumulations comprise a functionalisation for binding to an analyte and wherein the functionalisation between the nanoparticle accumulations and the functionalisation of the nanoparticle accumulations are specific for the same analyte.

15. The QCM sensor as claimed in claim 13, wherein the nanoparticle accumulations comprise a functionalisation for binding to an analyte and wherein the functionalisation between the nanoparticle accumulations and the functionalisation of the nanoparticle accumulations are specific for different analytes.

16. The QCM sensor as claimed in claim 1, wherein the nanoparticle accumulations comprise a functionalisation for binding to an analyte.

17. The QCM sensor as claimed in claim 1, wherein the plasmonic nanoparticles have an average diameter in the range from 8 to 30 nm.

18. A method for detecting an analyte comprising:
providing a quartz crystal microbalance (QCM) sensor comprising:
  a piezoelectric substrate,
  at least two electrodes in contact with the substrate to induce shear deformations therein through inverse piezoelectric effect,
  the substrate having a sensing surface, and on that surface, a pattern of plasmonic nanoparticle accumulations protruding from the surface, wherein each nanoparticle accumulation comprises a plurality of plasmonic nanoparticles arranged about an ellipsoidal-cap-shapeda hump, and-wherein inter-accumulation plasmonic hot spots are present between neighbouring accumulations of the pattern that are separated a distance that amounts to or to less than the lesser of the average diameter of the accumulations of the pattern and 10 nm, and wherein the sensing surface comprises a plasmonic metal surface;
contacting the sensing surface with a fluid to be analysed, thereby allowing adsorption of the analyte on the sensing surface;
detecting adsorption of the analyte on the sensing surface by at least one of localised surface plasmon resonance (LSPR), surface enhanced Raman spectroscopy (SERS) and metal enhanced fluorescence (MEF) measurement(s); and
determining an amount of adsorbate by QCM measurement(s).

* * * * *